(12) United States Patent
Sueki et al.

(10) Patent No.: US 7,154,694 B2
(45) Date of Patent: Dec. 26, 2006

(54) SERVO WRITER

(75) Inventors: Minoru Sueki, Odawara (JP); Toru Nakao, Odawara (JP); Takahisa Izumida, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/043,116

(22) Filed: Jan. 27, 2005

(65) Prior Publication Data

US 2005/0195516 A1  Sep. 8, 2005

(30) Foreign Application Priority Data

Mar. 3, 2004  (JP) .............................. 2004-059554

(51) Int. Cl.
*G11B 15/18* (2006.01)

(52) U.S. Cl. ...................................... 360/69

(58) Field of Classification Search ............... 360/69, 360/77.12, 48, 78.02, 121, 122; 428/212; 29/603.07
See application file for complete search history.

(56) References Cited

U.S. PATENT DOCUMENTS

| | | | |
|---|---|---|---|
| 4,675,760 A * | 6/1987 | Stadelmann et al. ..... 360/77.14 |
| 5,432,652 A * | 7/1995 | Comeaux et al. ........ 360/77.12 |
| 5,448,430 A * | 9/1995 | Bailey et al. ............ 360/77.12 |
| 5,629,813 A * | 5/1997 | Baca et al. .............. 360/77.12 |
| 5,946,159 A * | 8/1999 | Chliwnyj et al. ........ 360/77.12 |
| 6,319,595 B1 * | 11/2001 | Katashima et al. ......... 428/212 |
| 6,614,607 B1 * | 9/2003 | Rothermel et al. ........... 360/48 |
| 6,903,895 B1 * | 6/2005 | Chliwnyj et al. ........ 360/78.02 |
| 2001/0007170 A1 * | 7/2001 | Beck et al. ............. 29/603.07 |
| 2002/0041982 A1 * | 4/2002 | Katashima et al. .. 428/694 BM |
| 2002/0057524 A1 * | 5/2002 | Beck et al. ................. 360/122 |
| 2003/0030939 A1 * | 2/2003 | Beck et al. ................. 360/121 |
| 2003/0188612 A1 | 10/2003 | Kobayashi et al. |

FOREIGN PATENT DOCUMENTS

JP  2003-141836 A  5/2003

* cited by examiner

*Primary Examiner*—Fred F. Tzeng
(74) *Attorney, Agent, or Firm*—Sughrue Mion, PLLC

(57) ABSTRACT

Disclosed is a servo writer which forms servo bands on information recording media so as to enable a drive to track the servo bands with great accuracy by using a recording/reproducing head. The servo writer includes a driving mechanism for running a tape-shaped information recording medium, a servo pattern writing means for writing servo patterns on the running tape-shaped information recording medium, thereby forming servo bands thereon, and a tape edge forming mechanism for cutting evenly an edge of the running tape-shaped information recording medium, so that the edge becomes parallel to the servo bands.

30 Claims, 5 Drawing Sheets

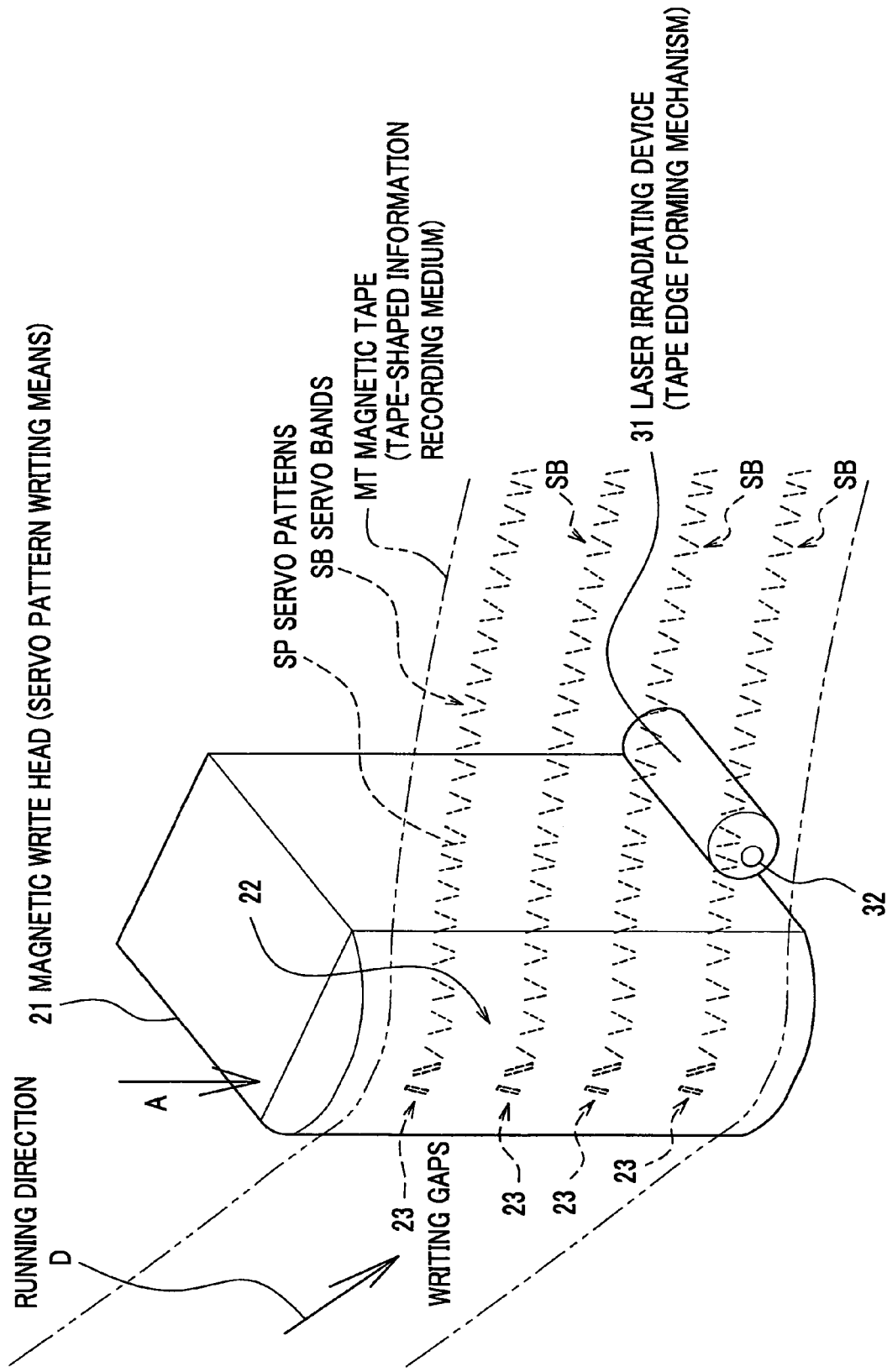

FIG.5A
PRIOR ART
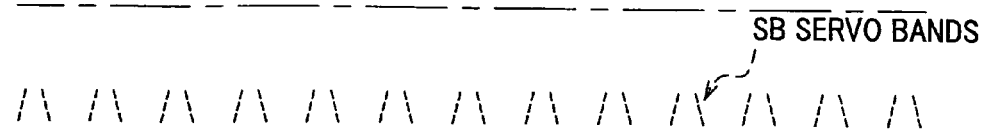
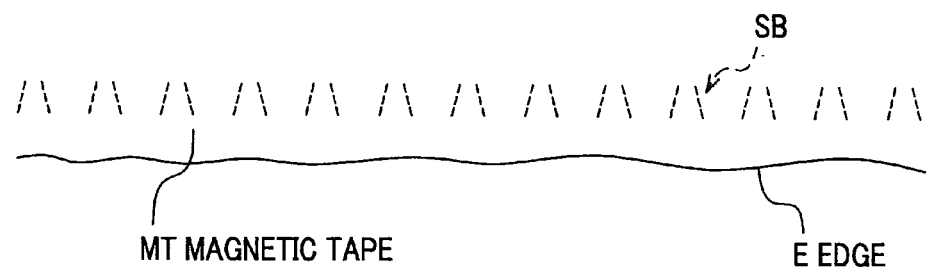
FIG.5B
PRIOR ART
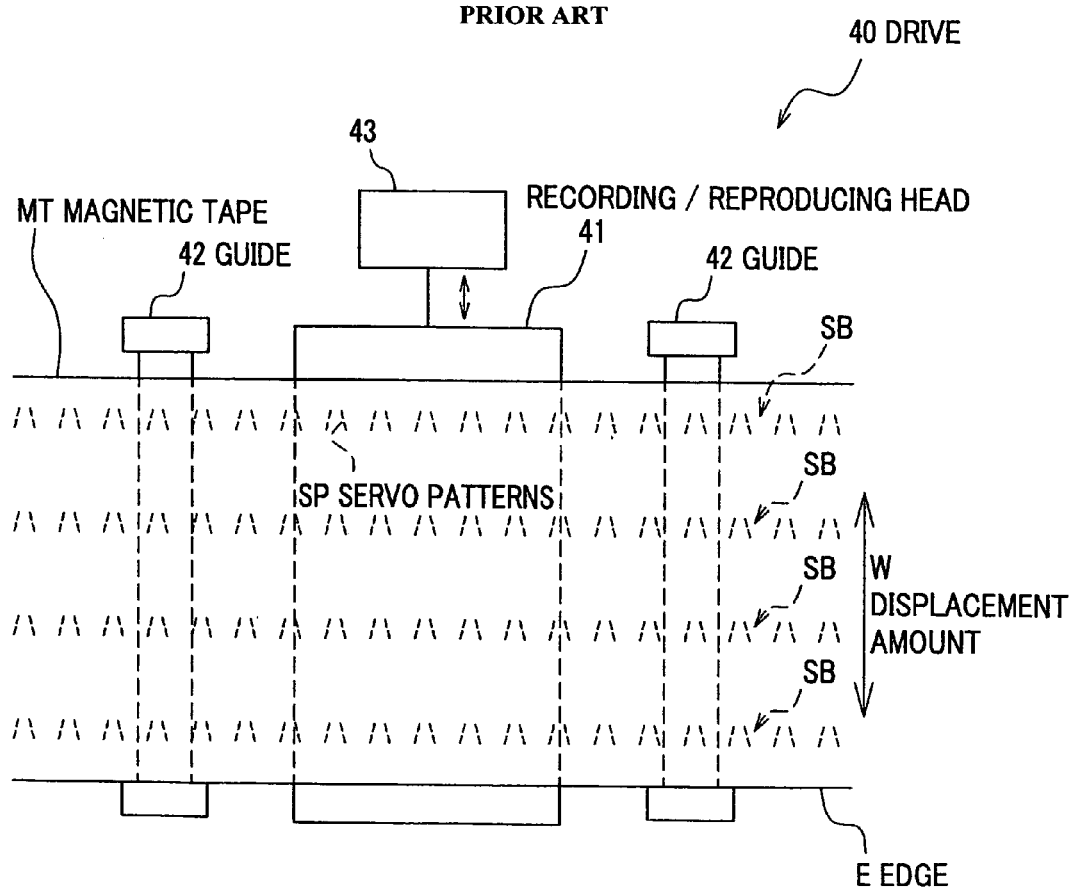

SERVO WRITER

BACKGROUND OF THE INVENTION

1. Field of the Invention

An apparatus consistent with the present invention relates to a servo writer for writing servo patterns on tape-shaped information recording media, such as magnetic tapes and optical tapes.

2. Description of the Related Art

Ever since magnetic tapes were applied to information recording media for computers, the recording density of magnetic tapes has been increased. To implement this high recording density, the linear recording technology is mainly employed. This linear recording technology is suitable for an information back-up use for computers in terms of the realization of a high data rate. A magnetic tape to which the linear recording technology is applied has multiple data bands thereon in the recording direction (e.g. along the long side of the tape), each data band being an area where information is to be recorded. Further, in this linear recording technology, multiple servo bands are also formed on the magnetic tape in the running direction prior to use. Each servo band is formed by writing multiple servo patterns on the magnetic tape, and these servo patterns are written by a servo writer.

A typical servo writer includes (a) a supply reel that feeds a magnetic tape, (b) a take-up reel that winds the magnetic tape, and (c) a magnetic head that writes servo patterns on the magnetic tape (see Japanese Unexamined Patent Application 2003-1418360). The servo writer uses the magnetic head to write servo patterns on a magnetic tape, while running the magnetic tape between the supply and take-up reels.

Furthermore, in order to record/reproduce information on or from magnetic tapes, a drive is used. Such a drive allows a recording/reproducing head to track the servo bands on a magnetic tape, while reading the servo patterns. Further, the recording/reproducing head records/reproduces information on or from the data bands between the adjacent servo bands, while tracking the servo bands. This enables positioning of the recording/reproducing head relative to the running magnetic tape (the data band) with great accuracy. As a result, the narrowing of the data bands and of the pitches between the adjacent data bands is achieved. In other words, high recording density magnetic tapes can be obtained.

A magnetic tape is formed by slitting a wide web into a predetermined width, and the edges of this tape are formed upon cutting. Referring to FIG. 5A that is a partially enlarged view depicting an edge portion of a magnetic tape, it is found that this tape edge is not always straight. If a magnetic tape MT having such a non-straight edge is operated by a drive, as shown in FIG. 5B, then it slightly displaced along the width while being led by a guide 42 of the drive.

Typically, a recording/reproducing head 41 of the drive manages to track servo bands SB under the control of a servo control mechanism 43 (actuator), even if the servo bands SB are slightly displaced. However, if a displacement amount W of the magnetic tape MT is excessively large, then it is difficult for the recording/reproducing head 41 to exactly trace the servo bands SB. In addition, it is expected that data bands and the pitches between adjacent data bands are increasingly narrowed to follow the recent trend toward the high recording density. Therefore, if the servo bands are not traced exactly, then the recording/reproducing head may be run them off, thus causing tracking errors.

Taking the above disadvantage into account, the present invention has been conceived. An object of the present invention is to provide a servo writer which forms servo bands on information recording media so as to enable a drive to track the servo bands with great accuracy by using a recording/reproducing head.

SUMMARY OF THE INVENTION

According to an aspect of the present invention, there is provided, a servo writer including:

(1) a driving mechanism for running a tape-shaped information recording medium;
(2) a servo pattern writing means for writing servo patterns on the running tape-shaped information recording medium, thereby forming servo bands thereon; and
(3) a tape edge forming mechanism for cutting evenly an edge of the running tape-shaped information recording medium, so that the edge becomes parallel to the servo bands.

According to another aspect of the present invention, there is provided, a servo writer including:

(4) a driving mechanism for running a tape-shaped information recording medium;
(5) a tape edge forming mechanism for cutting evenly an edge of the running tape-shaped information recording medium; and
(6) a servo pattern writing means for recording servo patterns on the tape-shaped information recording medium, thereby forming servo bands arranged parallel to the edge of the tape-shaped information recording medium.

In the information recording medium on which the servo bands have been written and of which edge has been formed by either of the above servo writers, the servo bands and the edge are parallel to each other. Accordingly, the distances between the respective servo bands and the edge are constant along the width of the information recording medium. In addition, when this information recording medium is played by the drive, guides of the drive lead the information recording medium while being in contact with the edge of the information recording medium. In this case, since the distances between the edge of the information recording medium and the respective servo bands are constant, the recording/reproducing head of the drive is not displaced from the individual servo bands along the width. This enables the recording/reproducing head of the drive to track the servo bands accurately. Consequently, with the above servo writer, the servo bands are formed on the information recording medium in such a way that the recording/reproducing head of the drive can trace the formed servo bands exactly.

In either of the above servo writers, a tape edge forming mechanism is positioned next to and downstream of the servo pattern writing means with respect to a running direction of the tape-shaped information recording medium.

Owing to the above arrangement, when the edge of the information recording medium is cut evenly by the tape edge forming mechanism, fragments of the information recording medium are prevented from contaminating on the servo pattern writing means. In other words, with either of the above servo writers, when the servo pattern writing means writes the servo patterns on the information recording medium, the fragments are prevented from contaminating on servo pattern writing means.

In conclusion, by applying the servo writer of the present invention, it is possible to provide information recording media having servo bands which a driver can use to trace accurately with recording/reproducing head.

BRIEF DESCRIPTION OF THE FIGURES

For more complete understanding of the present invention and the advantages hereof, reference is now made to the following description taken in conjunction with the accompanying figures wherein:

FIG. 2 is a perspective view depicting the periphery of a magnetic write head of the servo writer;

FIG. 5A is a partially enlarged view depicting an edge of a magnetic tape on which servo bands have been formed by a conventional servo writer; and FIG. 5B is a schematic view depicting a mode where a drive plays a magnetic tape on which servo bands have been formed by the conventional servo writer.

DETAILED DESCRIPTION OF THE EXEMPLARY EMBODIMENTS OF THE INVENTION

A description will be given below in detail of one embodiment of the present invention, with reference to accompanying figures as appropriate.

Figure 1:
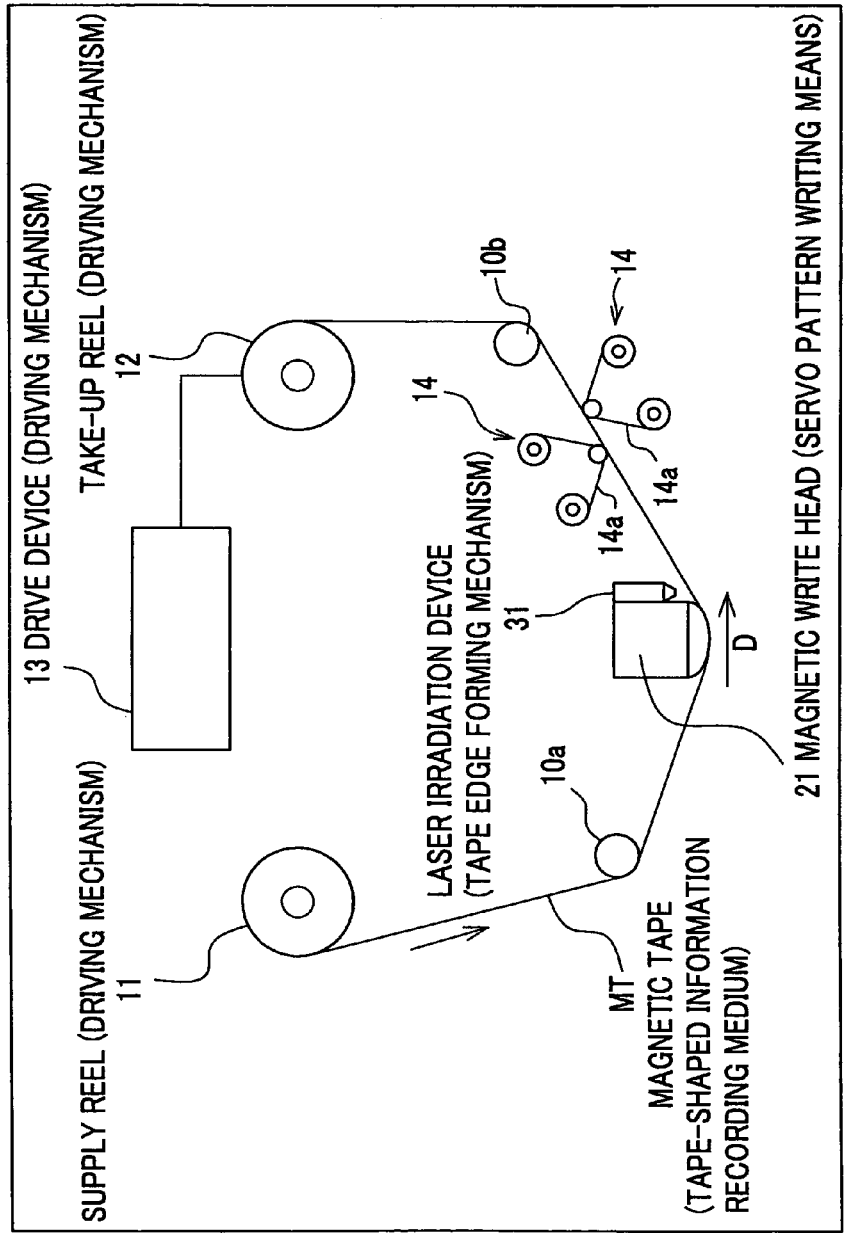
FIG. 1 is a schematic view depicting a servo writer according to an embodiment of the present invention.

Referring to FIG. 1, a servo writer 1 includes, as main components, a supply reel 11, a take-up reel 12, a drive device 13, a magnetic write head 21, a laser irradiating device 31 and a cleaning device 14. Note that the supply reel 11, take-up reel 12 and drive device 13 constitute a driving mechanism, and further, the magnetic write head 21, the laser irradiating device 31 and a magnetic tape MT correspond to a servo pattern writing means, a tape edge forming mechanism and a tape-shaped information recording medium, herein. The servo writer 1 further includes a power source, a verify device that inspects servo patterns having been written on the magnetic tape MT, and the like, which are not all shown in the figures.

The supply reel 11 has, at a large-diameter pancake, the magnetic tape MT which has been formed by cutting a wide web source into a product width beforehand, and feeds this magnetic tape MT to the take-up reel 12. On the other hand, the take-up reel 12 winds the magnetic tape MT fed from the supply reel 11.

The drive device 13 drives the take-up reel 12, and includes a motor, a motor driving circuit and a gear, which are not all shown in the figures. The motor driving circuit supplies a current to the motor, and the gear couples a motor shaft to the take-up reel 12. The drive device 13 rotates the motor with a current generated by the motor driving circuit. Also, the drive device 13 transmits this torque to the take-up reel 12 through the motor shaft and the gear, thereby driving the take-up reel 12.

The magnetic write head 21 writes servo patterns on the magnetic tape MT, and is positioned in contact with the running magnetic tape MT being guided by first and second guides 10a and 10b, as shown in FIG. 1. The magnetic write head 21 has a contact surface 22 to be in contact with the magnetic tape MT, and writing gaps 23 are formed on this contact surface 22, as shown in FIG. 2. In this case, each writing gap 23 is trapezoidal in cross-section. This technique is applied to any shape, pattern, or scheme of servo signal. In one embodiment, the magnetic write head 21 has the four writing gaps 23 arranged along the width of the magnetic tape MT at regular intervals. Each writing gap 23 generates leakage flux directed from the contact surface 22 toward the magnetic tape MT, when a coil (not shown) of the magnetic write head 21 is supplied with a pulse current. In other words, each writing gap 23 intermittently generates leakage flux with the pulse current, whereby a servo band SB composed of trapezoidal servo patterns SP is formed in a running direction D (i.e. the long side of the magnetic tape MT). As a result, the four servo patterns SP are formed parallel to one another.

The laser irradiating device 31 cuts the edge of the magnetic tape MT evenly. As shown in FIG. 2, the laser irradiating device 31 is placed next to and downstream of the magnetic write head 21 relative to the running direction D of the magnetic tape MT, and is fixed to the magnetic write head 21. Further, the laser irradiating device 31 has a laser light emitting spot 32 facing the edge of the running magnetic tape MT. The laser irradiating device 31 is provided with any given laser, such as a gas laser, a solid laser, a semiconductor laser and a dye laser. Concretely, this laser may be an ArF excimer laser, a KrF excimer laser, a carbon dioxide gas laser and an Nd YAG laser. Among them, an RF excitation carbon dioxide gas laser ($\lambda$=10.6 μm) is most suitable. The output power of the laser may be about 5W to 100W.

Referring now to FIG. 1, the cleaning device 14 cleans up the running magnetic tape MT, and is placed downstream of the laser irradiating device 31 relative to the running direction D. The cleaning device 14 may be, but not exclusively, a known product such as a cleaning tape 14a that wipes the surfaces of the magnetic tape M.

Next, behavior and effect of the servo writer according to one embodiment of the present invention will be described below, with reference to the figures as appropriate.

Figure 3A:
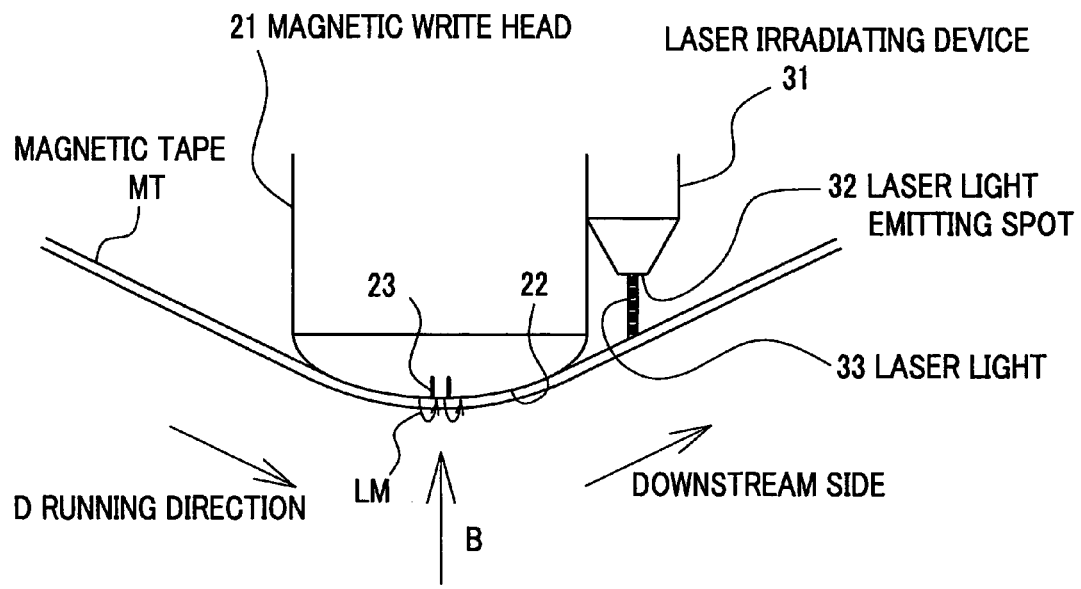
FIG. 3A is a schematic view depicting the magnetic write head and a laser irradiating device of the servo writer, as seen from an arrow A of FIG. 2.

First, continuing to FIG. 1, in the servo writer 1, the front part of the magnetic tape MT is pulled out from the supply reel 11, and is fixed to the center of the take-up reel 12 past the first guide 10a, magnetic write head 21 and second guide 10b. Once the take-up reel 12 is driven by the drive device 13, the magnetic tape MT is fed from the supply reel 11 to the take-up reel 12. In this case, as shown in FIG. 3A, the magnetic tape MT runs in contact with the contact surface 22 of the magnetic write head 21, while being guided by the first and second guides 10a and 10b.

Figure 3B:
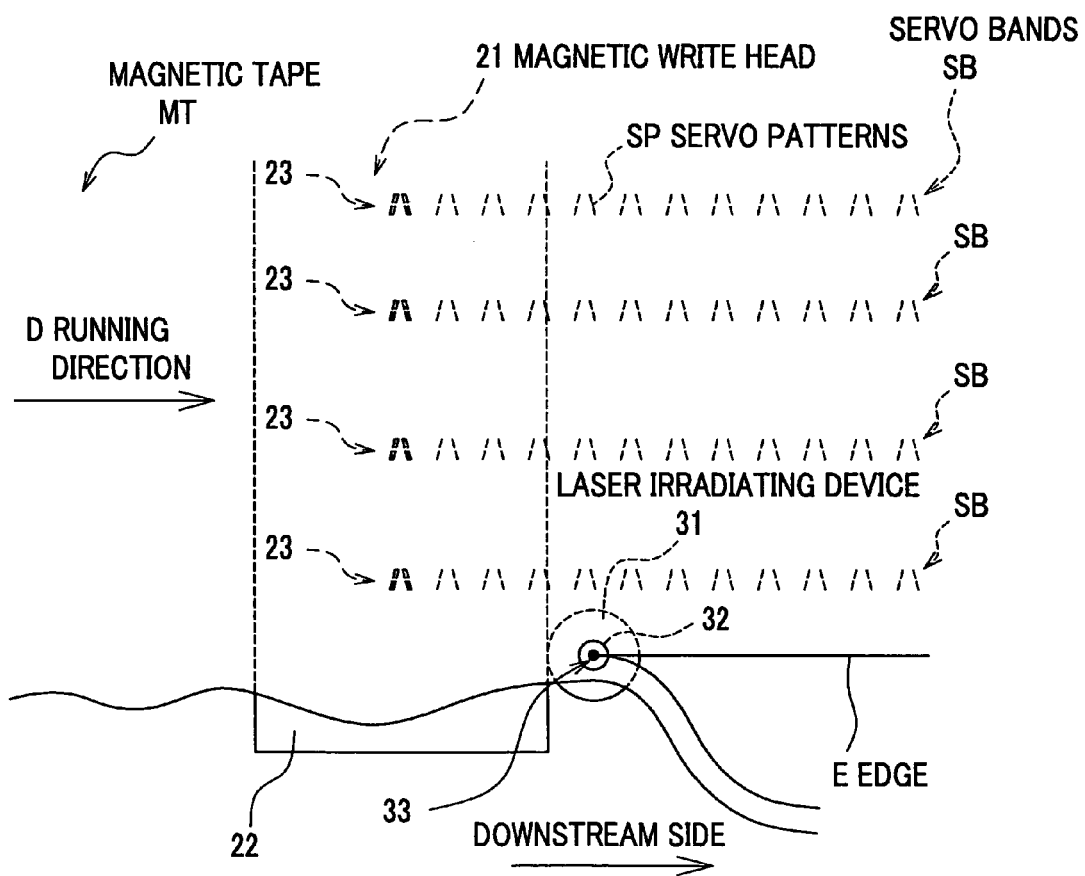
FIG. 3B is a schematic view depicting the magnetic write head and the laser irradiating device, as seen from an arrow B of FIG. 2.

Second, referring to FIG. 3A again, the writing gaps 23 of the magnetic write head 21 generate leakage flux LM directed from the contact surface 22 to the magnetic tape MT. Owing to this leakage flux LM, the trapezoidal servo patterns SP are continuously written on the magnetic tape MT in the running direction D, as shown in FIG. 3B. These servo patterns SP arranged continuously constitute a servo band SB. In one embodiment, the four servo bands SB are formed parallel to one another in the running direction D, because the four writing gaps 23 are formed on the magnetic write head 21.

While the servo bands SB are formed on the magnetic tape MT, the laser irradiating device 31 which is placed downstream of the magnetic write head 21 emits laser light 33 from the laser light emitting spot 32, as shown in FIG.

3A. In this case, the laser irradiating device 31 is placed next to the magnetic write head 21, and the laser light emitting spot 32 faces the edge (to be cut) of the running magnetic tape MT. As a result, by means of the laser light 33 emitted from the laser light emitting spot 32, the non-straight edge of the magnetic tape MT is reshaped uniformly with respect to the servo writing mechanism, so that an edge E is formed on the magnetic tape MT in parallel with the servo bands SB. Since the laser irradiating device 31 is positioned downstream of the magnetic write head 21, fragments of the magnetic tape MT are prevented from contaminating on the magnetic write head 21, when the edge of the magnetic tape MT is cut evenly by means of the laser light 33 (the laser irradiating device 31). In other words, the servo writer 1 prevents the fragments from affecting the process by which the magnetic write head 21 writes the servo patterns SP on the magnetic tape MT (see FIG. 3B).

Furthermore, as shown in FIG. 1, the magnetic tape MT of which edge has been cut evenly is cleaned up by the cleaning device 14, so that the fragments contaminating on the magnetic tape MT are removed. Finally, the servo writer 1 uses the take-up reel 12 to wind up the magnetic tape MT of which the edge E has been formed in parallel with the servo bands SB, thus completing the writing process.

Figure 4:
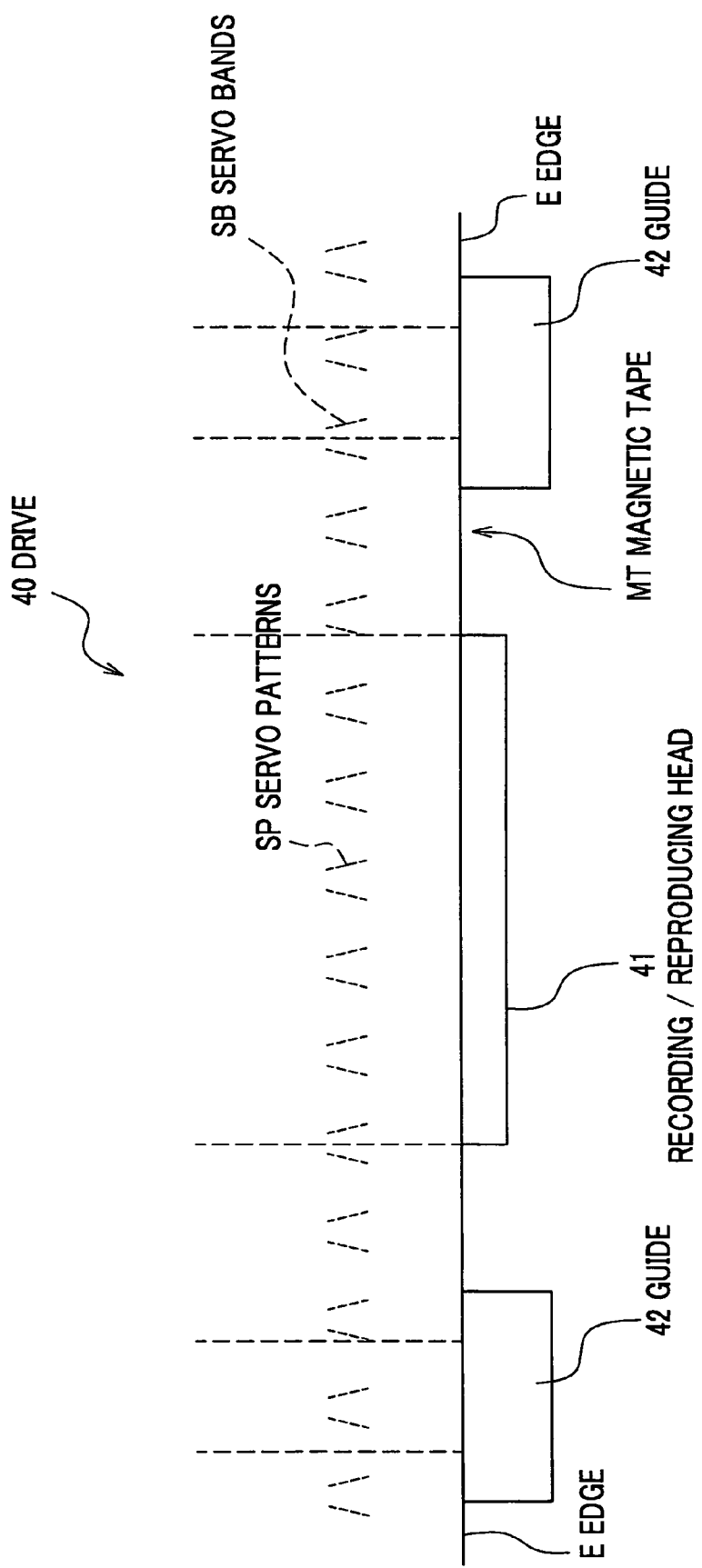
FIG. 4 is a schematic view depicting a mode where a drive plays a magnetic tape on which servo bands have been formed by the servo writer.

When the magnetic tape MT (see FIG. 2) on which the servo bands SB has been formed by the servo writer 1 described above (see FIG. 1) is played by a drive 40, a guide 42 of the drive 40 guides the magnetic tape MT in contact with the edge E, as shown in FIG. 4. In this case, since the edge E of the magnetic tape MT is parallel to the servo bands SB, the distances between the edge E and the respective servo bands SB along the width of the magnetic tape MT are constant. Accordingly, the recording/reproducing head 41 of the drive 40 is not displaced from the individual servo bands SB along the width. This enables the recording/reproducing head 41 to surely track the servo bands SB.

Up to this point, the servo writer according to one embodiment of the present invention has been described. However, a servo writer of the present invention is not limited to that of the embodiment. In one embodiment, a medium on which the servo writer 1 writes the servo patterns SP is the magnetic tape MT. However, in the present invention, the medium is not limited to a magnetic tape, but it may be an optical tape, for example.

The laser irradiating device 31 is positioned downstream of and next to the magnetic write head 21 in one embodiment, but the position of the laser irradiating device 31 is not limited to the above position. It may be any position as long as the edge E can be formed in parallel to the servo bands SB. For example, unless the magnetic tape MT is displaced between the magnetic write head 21 and the take-up reel 12 along the width, the laser irradiating device 31 may be placed at any position between the magnetic write head 21 and the take-up reel 12 and on the running route of the magnetic tape MT. However, it is preferable that the laser irradiating device 31 is located between the magnetic write head 21 and the second guide 10b.

In one embodiment, the laser irradiating device 31 is placed downstream of the magnetic write head 21, so that it forms the edge E on the magnetic tape MT after the servo bands SB are formed on the magnetic tape MT. However, the position of the laser irradiating device is not limited to the above position. Alternatively, the laser irradiating device 31 may be placed upstream of the magnetic write head 21, so that it forms the edge E of the magnetic tape MT before the servo bands SB are formed on the magnetic tape MT. In this case, it is preferable that the laser irradiating device 31 may also be located next to the magnetic write head 21. Further, unless the magnetic tape MT is displaced between the supply reel 11 and the magnetic write head 21 along the width, the laser irradiating device 31 may be placed at any position between the supply reel 11 and the magnetic write head 21 and on the running route of the magnetic tape MT. However, it is preferable that the laser irradiating device 31 may be placed between the first guide 10a and the magnetic write head 21. Furthermore, the laser irradiating device 31 may be built into the magnetic write head 21, so that the laser irradiating device 31 forms the edge E on the magnetic tape MT at the same time when the servo bands SB are formed on the magnetic tape MT.

In one embodiment, the single laser irradiating device 31 is provided to form the edge E on the one side of the magnetic tape MT, but the number of the laser irradiating devices 31 is not limited to one. Alternatively, the double laser irradiating devices 31 may be provided to form both edges E of the magnetic tape MT.

In one embodiment, a tape edge forming mechanism may be, but not exclusively, the laser irradiating device 31. However, it may be a Goebel slitter or a jet discharge mechanism for discharging fluid in a jet.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A servo writer comprising:
   a driving mechanism for running a tape-shaped information recording medium;
   a servo pattern writing means for writing servo patterns on the running tape-shaped information recording medium, thereby forming servo bands thereon; and
   a tape edge forming mechanism for cutting evenly an edge of the running tape-shaped information recording medium, so that the edge becomes parallel to the servo bands.

2. The servo writer according to claim 1,
   wherein the tape edge forming mechanism is positioned next to and downstream of the servo pattern writing means with respect to a running direction of the tape-shaped information recording medium.

3. The servo writer according to claim 1, wherein the tape edge forming mechanism comprises a laser irradiating mechanism.

4. The servo writer according to claim 3,
   wherein the laser irradiating mechanism has a gas laser.

5. The servo writer according to claim 3,
   wherein the laser irradiating mechanism has a solid state laser.

6. The servo writer according to claim 3,
   wherein the laser irradiating mechanism has a semiconductor laser.

7. The servo writer according to claim 3,
   wherein the laser irradiating mechanism has a dye laser.

8. The servo writer according to claim 3,
   wherein the laser irradiating mechanism has a carbon dioxide gas laser.

9. The servo writer according to claim 1,
   wherein the tape edge forming mechanism comprises a Goebel slitter.

10. The servo writer according to claim 1,
    wherein the tape edge forming mechanism comprises a jet discharge mechanism for discharging fluid in a jet.

11. The servo writer according to claim 1, further comprising a cleaning mechanism for cleaning the tape-shaped information recording medium, the cleaning mechanism being positioned downstream of the tape edge forming mechanism with respect to a running direction of the tape-shaped information recording medium.

12. The servo writer according to claim 1, wherein the tape-shaped information recording medium is a magnetic tape.

13. The servo writer according to claim 1, wherein the tape-shaped information recording medium is an optical tape.

14. The servo writer according to claim 1, wherein the tape-shaped information recording medium is cut on both edges so that the edges become parallel to the servo bands.

15. The servo writer according to claim 1, wherein the tape edge forming mechanism is secured to the servo pattern writing means.

16. A servo writer comprising:
a driving mechanism for running a tape-shaped information recording medium;
a tape edge forming mechanism for cutting evenly an edge of the running tape-shaped information recording medium; and
a servo pattern writing means for recording servo patterns on the tape-shaped information recording medium, thereby forming servo bands arranged parallel to the edge of the tape-shaped information recording medium,
wherein the tape edge forming mechanism cuts the edge of the running tape-shaped information recording medium such that the edge forms a reference for writing servo patterns.

17. The servo writer according to claim 16,
wherein the tape edge forming mechanism comprises a Goebel slitter.

18. The servo writer according to claim 16, wherein the tape-shaped information recording medium is a magnetic tape.

19. The servo writer according to claim 16, wherein the tape-shaped information recording medium is an optical tape.

20. The servo writer according to claim 16, wherein the tape edge forming mechanism is secured to the servo pattern writing means.

21. The servo writer according to claim 16, wherein the tape edge forming mechanism cuts the edge of the running tape-shaped information recording medium in direction of tape travel.

22. A servo writer comprising:
a driving mechanism for running a tape-shaped information recording medium;
a tape edge forming mechanism for cutting evenly an edge of the running tape-shaped information recording medium; and
a servo pattern writing means for recording servo patterns on the tape-shaped information recording medium, thereby forming servo bands arranged parallel to the edge of the tape-shaped information recording medium,
wherein the tape edge forming mechanism comprises a laser irradiating mechanism.

23. The servo writer according to claim 22,
wherein the laser irradiating mechanism has a gas laser.

24. The servo writer according to claim 22,
wherein the laser irradiating mechanism has a solid state laser.

25. The servo writer according to claim 22,
wherein the laser irradiating mechanism has a semiconductor laser.

26. The servo writer according to claim 22,
wherein the laser irradiating mechanism has a dye laser.

27. The servo writer according to claim 22,
wherein the laser irradiating mechanism has a carbon dioxide gas laser.

28. A servo writer comprising:
a driving mechanism for running a tape-shaped information recording medium;
a tape edge forming mechanism for cutting evenly an edge of the running tape-shaped information recording medium; and
a servo pattern writing means for recording servo patterns on the tape-shaped information recording medium, thereby forming servo bands arranged parallel to the edge of the tape-shaped information recording medium,
wherein the tape edge forming mechanism comprises a jet discharge mechanism for discharging fluid in a jet.

29. A servo writer comprising:
a driving mechanism for running a tape-shaped information recording medium;
a tape edge forming mechanism for cutting evenly an edge of the running tape-shaped information recording medium;
a servo pattern writing means for recording servo patterns on the tape-shaped information recording medium, thereby forming servo bands arranged parallel to the edge of the tape-shaped information recording medium; and
a cleaning mechanism for cleaning the tape-shaped information recording medium, the cleaning mechanism being positioned downstream of the tape edge forming mechanism with respect to a running direction of the tape-shaped information recording medium.

30. A servo writer comprising:
a driving mechanism for running a tape-shaped information recording medium;
a tape edge forming mechanism for cutting evenly an edge of the running tape-shaped information recording medium; and
a servo pattern writing means for recording servo patterns on the tape-shaped information recording medium, thereby forming servo bands arranged parallel to the edge of the tape-shaped information recording medium,
wherein the tape-shaped information recording medium is cut on both edges so that the edges become parallel to the servo bands.

* * * * *